United States Patent
Lin et al.

(10) Patent No.: US 11,757,666 B2
(45) Date of Patent: Sep. 12, 2023

(54) REAL-TIME VIRTUAL MEETING TOOL THAT COMBINES VIDEO CHAT WITH USER ACTIVITIES

(71) Applicants: Joy B. Lin, Rockaway, NJ (US); Randall S. Tinfow, Rockaway, NJ (US)

(72) Inventors: Joy B. Lin, Rockaway, NJ (US); Randall S. Tinfow, Rockaway, NJ (US)

( * ) Notice: Subject to any disclaimer, the term of this patent is extended or adjusted under 35 U.S.C. 154(b) by 0 days.

(21) Appl. No.: 17/242,125

(22) Filed: Apr. 27, 2021

(65) Prior Publication Data

US 2021/0392008 A1 Dec. 16, 2021

Related U.S. Application Data

(60) Provisional application No. 63/038,189, filed on Jun. 12, 2020.

(51) Int. Cl.
*H04L 12/18* (2006.01)
*H04N 7/15* (2006.01)

(52) U.S. Cl.
CPC ...... *H04L 12/1818* (2013.01); *H04L 12/1822* (2013.01); *H04N 7/155* (2013.01)

(58) Field of Classification Search
CPC . H04L 12/1818; H04L 12/1822; H04N 7/155; H04N 7/157
See application file for complete search history.

(56) References Cited

U.S. PATENT DOCUMENTS

| | | | | |
|---|---|---|---|---|
| 8,225,348 | B2 * | 7/2012 | Morris | H04N 21/4788 725/37 |
| 9,635,072 | B1 * | 4/2017 | Murphy | H04L 12/1818 |
| 9,710,142 | B1 * | 7/2017 | Vendrow | H04L 65/403 |
| 10,367,858 | B2 * | 7/2019 | Borghetti | H04L 67/02 |
| 10,382,722 | B1 * | 8/2019 | Peters | H04N 7/152 |
| 2009/0063991 | A1 * | 3/2009 | Baron | G06Q 10/10 715/751 |
| 2011/0093273 | A1 * | 4/2011 | Lee | H04L 65/4038 348/E7.083 |
| 2012/0327180 | A1 * | 12/2012 | Thorson | H04N 7/15 348/E7.083 |
| 2015/0200785 | A1 * | 7/2015 | Gupta | H04L 67/02 709/204 |
| 2017/0332044 | A1 * | 11/2017 | Marlow | H04L 65/403 |
| 2019/0341050 | A1 * | 11/2019 | Diamant | H04N 7/155 |

* cited by examiner

Primary Examiner — Nam T Tran
(74) *Attorney, Agent, or Firm* — Zale Patent Law, Inc.; Lawrence P. Zale

(57) ABSTRACT

A real-time virtual conference system is disclosed that combines video call with structured activities. The invention can deliver various forms of web content, on command, with integrated video. User actions are monitored, measured, and reported in real-time, so that the host understands the progress of the users. The system employs an activity scheduler which allows a Host to set up a schedule of activities during a setup phase which can run sequentially or change at predetermined times during an Operation Phase. This provides a structure to the session. The system employs standard browser software for directly interacting with websites, or standard applications. The Host has control of the browser settings, layout state and content state of the users' devices to synchronize and control several user devices during a remote session and provide desired output in a desired form to each user device.

19 Claims, 11 Drawing Sheets

Activities Schedule 6001

| Sequence | Description | URL/Activity Location |
|---|---|---|
| 1 | Identify President and VP | https://v-school.org/1234567 |
| 2 | Sort Presidents by Date | https://quizlet.com/987654 |
| 3 | Match Presidents to Event | https://v-school.org/abcdef |
| 4 | Identify First President | https://docs.google.com/presentation/d/1xPvPQtaNrK1/edit?usp=sharing |
| 5 | Identify Assasinated Presidents | https://v-school.org/8101112 |
| 6 | Mortgage Calculator | https://Host.com/Mortgage Calculator |
| 7 | Rank Your Primary Interests | https://Interest.com/primary interests.html |

*Figure 6*

| Student ID | Name | Q1 | Q2 | Q3 | Q4 | CheckIn | CheckOut | ClassTime |
|---|---|---|---|---|---|---|---|---|
| 1 | Fred Smith | Y | Y | X | Y | 14:02 | 15:59 | 2:01 |
| 2 | Donna Wu | X | Y | Y | Y | 14:00 | 16:01 | 2:01 |
| 3 | Jack Thomas | Y | Y | Y | Y | 13:57 | 16:04 | 2:07 |
| *4 | Jaimee Lopez | - | Y | Y | - | 14:11 | 15:48 | 1:37 |

*Figure 11*

REAL-TIME VIRTUAL MEETING TOOL THAT COMBINES VIDEO CHAT WITH USER ACTIVITIES

CROSS-REFERENCE TO RELATED APPLICATIONS

This application claims priority to U.S. Provisional Patent Application 63/038,189 filed Jun. 12, 2020 "A Real-time Virtual Classroom That Combines Video Chat With Student Activity" by Joy B. Lin hereby incorporated by reference to the extent that it does not conflict with this application.

STATEMENT REGARDING FEDERALLY SPONSORED RESEARCH

Not Applicable.

BACKGROUND

1. Field of Invention

The present invention relates to a virtual conferencing system for facilitating structured remote video meetings that includes structured, interactive activities and user feedback.

2. Description of Related Art

Integrated Video & Activities

Users find it difficult to maintain focus during online meetings and lectures. This includes students during remote classroom sessions as well as business users participating in virtual meetings. In remote classroom sessions, children ages 5-9 typically last less than 10 minutes before drifting away from video conferencing applications. Even college students struggle to concentrate in passive sessions with limited activity.

In order to engage in an activity or a learning challenge, current video sessions are disrupted by requiring users to visit web pages outside the virtual meeting room. The equivalent in the physical world would be going to another classroom every time the teacher asks a question or passes out a pop quiz. That is distracting and disruptive.

Some virtual sessions are based on sharing content via whiteboards. This effectively limits the sessions to small groups.

Currently, these cause problems with on-line conferences.

Feedback

In physical meetings, teachers, and other presenters (also referred to as a "Hosts") can read how well their content is being received by observing body language, posture, and attitude. When cameras are turned off, presenters are effectually staring at an empty room. Current online sessions make it difficult to evaluate message reception because current systems provide little or no real-time feedback.

Reporting User Participation

Also, in current systems, there is no way of measuring and reporting participation and activity of the users. This would also be helpful in providing feedback to the presenter.

In current systems, all members of an audience view the same content. If this is a video or the output of an application. There are times when it is beneficial for individual communication with one or a few of the members of the audience while the remainder of the audience is viewing different video output. This may be the case in a classroom setting in which two or three students do not understand a concept, while the remainder of the class does. Individual instruction would be beneficial in this case.

Low Quality Video

There are also problems of low-quality imaging and time-lag among users with current systems, especially when videos are shown to an audience. For example, when a link to a YouTube video is shared, each user separately controls video playback, resulting in audience viewing that is uncoordinated and not synchronized. Everyone is watching video at a slightly different time. This makes it difficult to follow and understand and impossible for a presenter to stop and discuss with viewers. It would be beneficial if there was a system which provide a universal, coordinated streaming for all users.

In some cases, video shown on a presenter's device is re-processed and "screen-shared" with viewers. This results in significant degradation of video quality and clarity.

It would also be beneficial to provide a system which has higher quality video streaming.

Many of the video conferencing systems are not interactive. For example, a Host using Zoom can bring up a spreadsheet in his/her screen, then share the spreadsheet image with all connected users using screen-sharing. The users may only view the screen, but cannot add, change, delete numbers on the spreadsheet.

Interactivity

There are some video conferencing systems that include interactive remote collaboration, such as Microsoft Teams. However, these require one to purchase a license for the software, and to be added to at least one 'team'. Without the license or being accepted into a team, remote collaboration is not possible.

Meeting Structure

Many of the existing remote meeting systems do not have a framework or structure for the meetings. Once the meeting starts, it is up to the Host or users to determine what is to be discussed, how users will collaborate, how meeting tasks will be managed, and how meeting time will be allocated and incorporate time reminders. Since the Host is typically concerned with running the meeting, it would be beneficial to have tools that will perform some of these tasks.

Currently, there is a need for a virtual meeting system which can synchronously, deliver high-quality video streaming, various forms of interactive web content, on teacher or presenter command, with integrated user activities arranged in a structured manner. There is also a need to measure and report user participation in real-time, so that the Host may receive feedback regarding progress of the users.

SUMMARY OF THE INVENTION

One embodiment of the present invention is a virtual conferencing system for providing a remote session between a plurality of remote users having:

a Host device adapted to receive input from and provide output to a Host;

a plurality of user devices each being operated by one of the remote users;

each of the user devices comprise:

a camera to provide live video feed;

a microphone to provide live audio feed;

a Host device memory having executable code, layout state and content state of activities running on each user device;

The current invention also includes a controller coupled to the user devices, wherein the controller comprises an activity scheduler that can operate in at least in a 'Setup Phase' and an 'Operation Phase'.

During the 'Setup Phase', the Host device interacts with the activity scheduler according to the input from the Host to:

create an activity schedule having activities to be executed, arrange the activities in a desired order of execution, and store the activity schedule in an activity storage;

wherein, during the 'Playback Phase', the activity scheduler causes the activities in the activity storage to execute on the user devices in the order defined by modifying the layout state or the content state of memory;

wherein the controller receives live video and audio feeds from the cameras and microphones of the participant user devices and directs the live feeds back to selected user devices.

The current invention may also be embodied as a virtual conferencing system receiving input from a Host to run a remote video conference for a plurality of users, having:

a Host device responsive to input from the Host for running the remote virtual conference;

user devices receive user input and provide output to users:

wherein the user devices each include:

an I/O device which receives input from, and provide output to a user operating the user device, a memory which stores and provides executable code, configurations, settings, layout state, content state and other information required to run the executable code to perform activities and calculations, and a processor coupled to the I/O device and memory adapted to load and run executable code from memory, receive input from I/O device and provide output to I/O device;

The current system also includes a server 600 coupled to the Host device 100 having:

a controller adapted to control the operation of the user devices;

a controller memory adapted to store executable code, configurations, settings and other information required to run the executable code to perform activities and calculations;

wherein the executable code within the controller memory comprises an activity scheduler which stores in, and retrieves from, activity storage, data and settings related to the functioning of the activity scheduler;

a cloud storage device having prestored data, configurations, settings, images, content and services applied through the Internet coupled to the Host device and the user devices;

the controller comprising an activity scheduler which reads activities of an activity schedule prestored in activity storage, and updates the content state of the user devices to execute the activity, and the controller is also capable of modifying the layout state to adjust the viewing parameters of activity being executed.

The current invention may also be embodied as a method of providing a virtual conference to remote users under the control of a Host, by performing the steps of:

providing a Host device which receives input from and provides output to the Host, providing a controller which includes an activity scheduler that is coupled to the Host device;

receiving Host input to select, preview, select order of execution and store a plurality of activities in an activity schedule;

connecting user devices to controller;

loading an activity specified in the activity schedule;

executing the specified activity;

updating the state of the user devices to adjust the execution of activities;

monitoring the user devices during execution of the activity to determine participation of users;

providing an indication of the participation of each user to the Host;

determining if all activities of the activity schedule have been completed.

If all of the activities in the activity schedule have not been completed, then continuing processing at step "loading" step above;

passing control of the system to Host device to acquire and publish closing remarks of Host; and ending the virtual conference.

BRIEF DESCRIPTION OF THE DRAWINGS

The above-mentioned features and steps of the invention and the manner of attaining them will become apparent, and the invention itself will be best understood by reference to the following description of the embodiments of the invention in conjunction with the accompanying drawings, wherein like characters represent like parts throughout the several views and in which:

FIG. 6 is a content table which indicates the sequence in which activities will execute during the Operation Phase.

FIG. 11 is Reporting Panel of a screen of a Host device showing user participation during a quiz.

DETAILED DESCRIPTION OF A PREFERRED EMBODIMENT OF THE INVENTION

1. Theory

Image Quality

Various remote video session systems are simply 'screenshot' systems. This means that a picture of the Hosts screen is taken and sent to all connected users. Therefore, if the meeting Host is running a video from a cloud provider, such as "YouTube.com", the video is sent to the host, played on the host's output screen, sampled into screen shots then sent by the Host's machine to a server which changes the sampling, scale, timing, compression of the video and relays the video to all connected users. This reprocessed video is of low quality, 'jerky', and the moving images often are out of synchronization with the accompanying audio. Users can only view the video and cannot interact with it.

If each user were to go directly to YouTube.com and directly view the original video, it would play smoothly and have much higher quality with the audio synchronized.

Proprietary Software

Many of these conventional remote session systems require proprietary software. This requires downloads and typically, membership or subscription fees.

There are also standard programs available, such as browsers, that can perform some of these functions. Many of these programs are free. Since they have various uses, more than likely, the users have used it in the past and are familiar with the programs. There is little or no 'start-up' education required, as opposed to the unique, proprietary programs used by conventional remote video conferencing systems.

Rooms

People in the same physical room can see each other, speak to each other and can experience any objects or displays in the room together. If a program were running on a large screen, all in the room could view it simultaneously.

Similarly, the current invention allows for all viewers in each of a number of 'logical rooms' to converse with each other, view each other, and experience the same software running. This will be described in greater detail below.

2. Implementation

Integrated Video & Activities

The invention can deliver various available forms of web content, on command, along with a live video of users (or "participants") in an integrated system.

Figure 1:
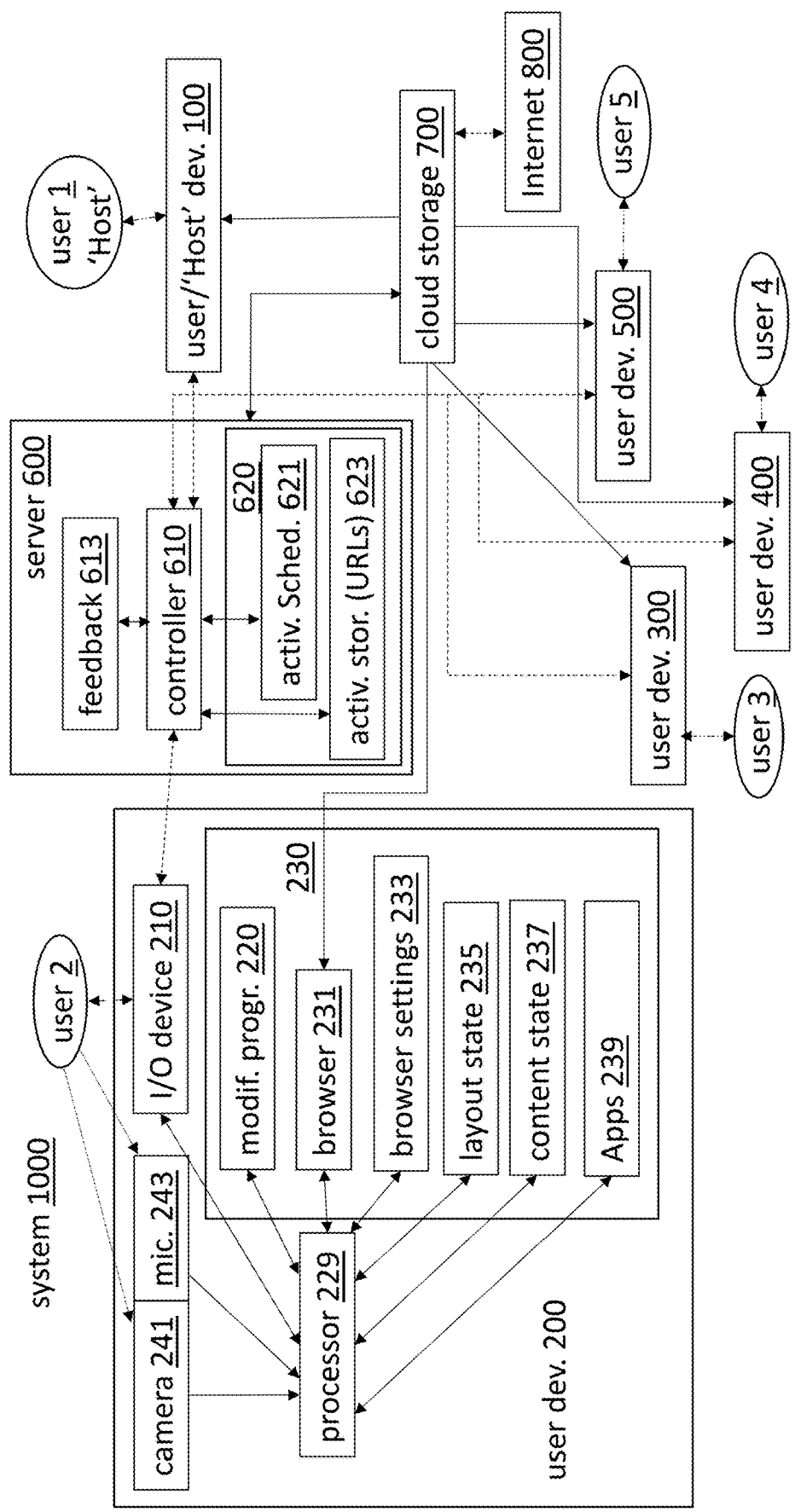
FIG. 1 shows a simplified block diagram of an embodiment of a system according to the current invention.

FIG. 1 shows a simplified block diagram of an embodiment of a system 1000 according to the current invention.

System 1000 has a plurality of users being user 1, user 2, user 3, user 4 and user 5. User 1 in this example is also referred to as "Host 1" running the meeting. In a remote classroom setting, the Host 1 is typically one or more teachers. (In the example shown in FIG. 1, there is only a single Host 1; however, it is within the spirit of the invention that one or more of the other Users can act as a Host at least part of the time.)

Users 2-5 connect and interact with a server 600 through user devices 200-500, respectively. Host 1 connects to controller 610 through Host device 100.

Host device 100 and user devices 200-500 are remote computing devices and may be smart phones, cell phones, laptops, computing pads, desktop computers or other computing devices which include the functionality as described for this system 1000.

One of the User devices, user device 200 is shows a few of its major elements to explain its functioning. I/O device 210 receives input from user 2 and may be a touch screen, keyboard, mouse, touchpad, software icons, or pictures. I/O device 210 provides the means for interacting with content and triggering functions using interface elements including those commonly referred to as "buttons", or other known input methods for computing systems such as keyboard strokes.

I/O device 210 also displays video images or other types of display to its users as output. It also may provide sound, synthesize speech, and provide tactile feedback, such as vibrations.

Memory 230 is a passive device is capable of storing executable code, settings and preferences, data and digital content. This may be volatile memory (RAM), non-volatile memory, firmware or a combination of these.

Executable code, such as conventional web browsers 231 or various Apps 239 are loaded into memory 230 or have been previously loaded into memory 230. This executable code has instructions which are recognized and executed by processor 229.

There may be configuration data, settings and other information required by the executable code which is also loaded or preloaded into memory 230. When the executable code is a browser 231, this configuration data may collectively be referred to as browser state 233.

There are also general settings such as the layout and display parameters of the screen which are stored in a layout state 235.

Other information required to run the I/O devices, such as I/O device 210 of user device 200 are stored in a layout state section 235 of memory 230 having information on the current display parameters, such as information the display type, width, height, video scanning parameters, current scan line, scan rate, resolution, refresh rate, windows open and display parameters for open windows, pointers, tables, and related data.

There is also information stored in the content state section 237 of memory 230 dealing with the content such as its location (URL), name, brief description, file format, owner, and related information.

One such executable program is a modification program 220 which allows a remote computing device to access, read and update information stored in memory 230. This may be controlled by the Host 1 through Host device 100, to manipulate the display parameters of the user devices 200-500 by changing the layout state 235.

The Host 1, through computing device 100, may also manipulate the content that user devices 200-500 are displaying to users 2-5 by manipulating the content state 237 of one or more user devices 200-500 through modification program 220. This modification program 220 may be a previously downloaded App, or is executable code placed on the user devices 200-500 by controller 610.

The Host 1 through computing device 100, may also manipulate the functioning of browsers 231 in user devices 200-500 for users 2-5 by manipulating the browser settings 233 of one or more user devices 200-500 through modification program 220.

A server 600, receives input from the Host 1, through Host device 100. Controller 610 of server 600 may include a processor, a memory 620 which includes executable code, such as "activity scheduler" 621 which will be described in more detail below, and associated settings, preferences and data. Memory 620 also receives, stores, web locations, such as URLs and other data in an activity storage 623. These are all accessible by the controller 610 and may be retrieved at a later time.

High Quality Video

Host device 100 and user devices 200-500 connect directly to a cloud storage 700. Cloud storage 700 represents a remote device containing memory for storing executable code, data, and content that is accessible through a network, such as the Internet. YouTube is one example of a cloud storage device. It may also be any number of content servers or software as a service (SaaS) providers.

Cloud storage 700 may stream video content directly to user devices 100-500. The controller 610 of FIG. 1 controls the user devices 200-500 by updating the layout state 235 and content state 237 in the user devices 200-500. This may be performed by controller 610 providing input to the I/O device 210 of each user device 200-500. The processor 229 can receive the input and provide updates to the layout state 235 and the content state 237. Optionally, this may be performed by downloading and running a modification program 220 on the user devices. The modifications to layout state 235 and content state 237 will adjust the content being viewed and the display parameters that a participant sees. Controller 610 can effectively start, stop, fast forward, rewind, change viewing parameters, etc. to the I/O display 210. Since the content feed is coming directly from its source, and not routed through the controller 610, each user device 200-500 is able to display higher quality video and audio.

Meeting Structure

Most conventional remote session systems simply link users by video and audio, but do not provide any structure or tools to define the structure of a meeting. It is up to the Host(s) to define a schedule and structure of the sessions. Since the Host(s) typically are responsible for running the sessions, and presenting content, such as a presentation, they must concentrate on their choice of words during the presentation, but also keep track of timing, run Apps at the proper time, change viewing screens of the users at the proper times to "share Screens", 'hand-off' control to other Hosts at the proper times and remember to provide all necessary capabilities and instructions to the users during the sessions.

Figure 2:
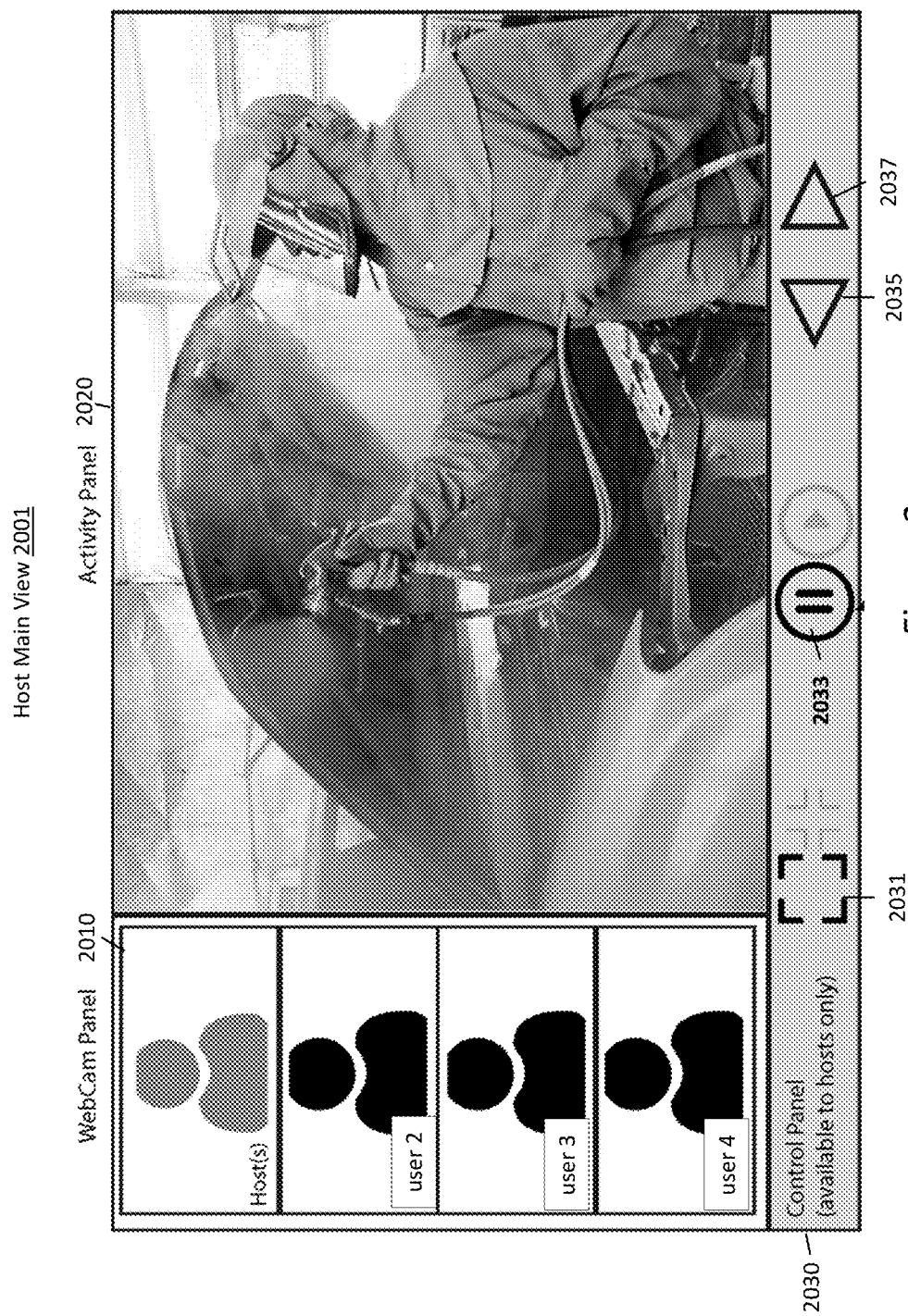
FIG. 2 is a simulated view of a display screen showing a presenter (or "Host") layout consisting of a webcam panel, an activity panel, and a control panel.

FIG. 2 shows one embodiment of a screen of an I/O device 210 of Host device 100 according to the current invention. Since user devices 200-500 employ cameras 241 (webcams) and microphones 243 they can provide a live video and audio feed to the controller 610. The controller 610 then acts like a router to route the live feeds of the Host and several users to selected devices. These are shown in a webcam panel 2010.

The controller 610 knows who is assigned to each 'room'. All of the live feeds of users in a room are visible to other users in the same room. Similarly, any activity output will be provided to all users in a given room but can be different from what is provided to users of different rooms.

There is also an activity panel 2020 which can run and display various types of images, play video, play sounds or run various types of programs or interactive Apps including games, polls, puzzles, spreadsheets, and documents, or other executable code that can by run and shared in web browsers. These collectively are referred to as "activities." The appearance of these activities are manipulated by the Host 1 using controls such as represented in Control Panel 2030.

The Host 1 controls the sessions so there is a control panel 2030 having a variety of icons allowing the Host 1 to set up schedules, load, run, pause, stop, and repeat parts of executable code, and remotely control the executable code, layout state 235 and content state 237 of the user devices 200-500 (as shown in FIG. 2).

The current system 1000 includes tools to allow Host(s) to set up schedules, Apps to run, control of the display and other functions before the remote sessions which is used as a 'guide' or 'blueprint' during the session. This is done during a "Setup Phase" before a session begins.

The system 1000 allows a Host 1 to define a schedule, which may be sequentially running the activities, running the activities based upon elapsed time since the session started, or based upon actual time. Points in the activity schedule may be set to progress from one App to another App or to move control from one Host to another Host. The activity scheduler 621 may be set up to provide alarms to the Host 1 as to when to switch to the next activity, have a countdown clock showing time until next activity, or simply change activities at a given time trigger.

Host 1 interacts through Host device 100 with an activity scheduler 621 in server 600. Host 1 employs Host device 100 to browse through various activities, Apps, and programs in cloud storage 700 or on the Internet 800, to find video clips, or interactive software services to use as an activity for users in a session.

Figure 3:
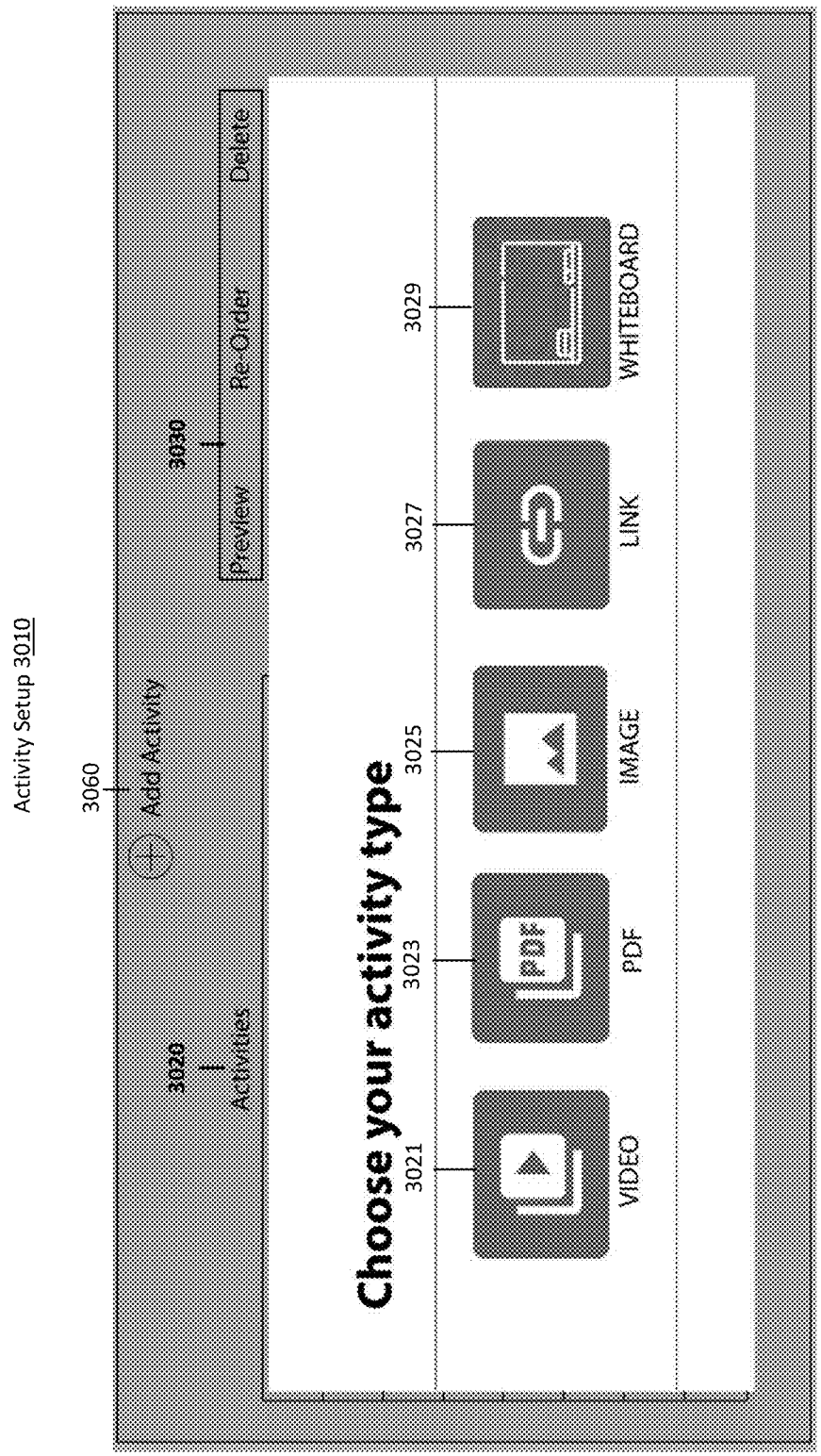
FIG. 3 is a pop-up panel of a Host's screen allowing the Host to select activities during the Setup Phase that are intended to run during the Operation Phase.

FIG. 3 is a pop-up panel of a Host's screen allowing the Host to select activities during the Setup Phase that are intended to run during the Operation Phase.

FIG. 3 shows an embodiment of an activity tab of a screen of I/O device of user device 100 allowing user 1 to select a type of activity. Activity 3021 is to show a video clip, activity 3023 is to display a pdf file, activity 3025 is to display an image other than a pdf file, activity 3027 is to jump to a hyperlink ("URL"), and activity 3029 is to launch a whiteboard.

Figure 4:
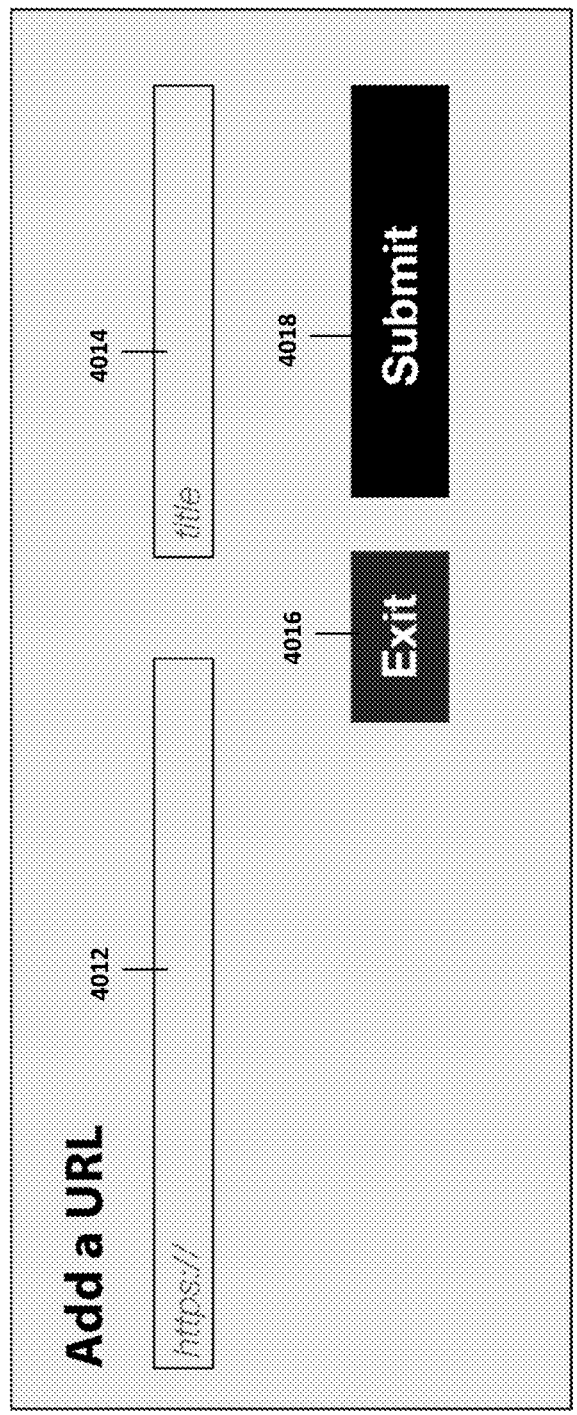
FIG. 4 show a pop-up screen which allows the Host to insert URLs during the Setup Phase to provided structure to the remote session during the Operation Phase.

If activity 3027 is selected, the screen changes to that shown in FIG. 4. FIG. 4 shows a pop-up screen which allows the Host 1 to insert hyperlinks during the Setup Phase to provide structure for the remote session during the Operation Phase. The Host 1 may type in a URL in field 4012 and optionally add a title to it in field 4014. Once this is done, the "Submit" button 4018 is activated which allows the Host to preview the web content. The hyperlink is then stored by activity scheduler 621 in activity storage 623.

Figure 5:
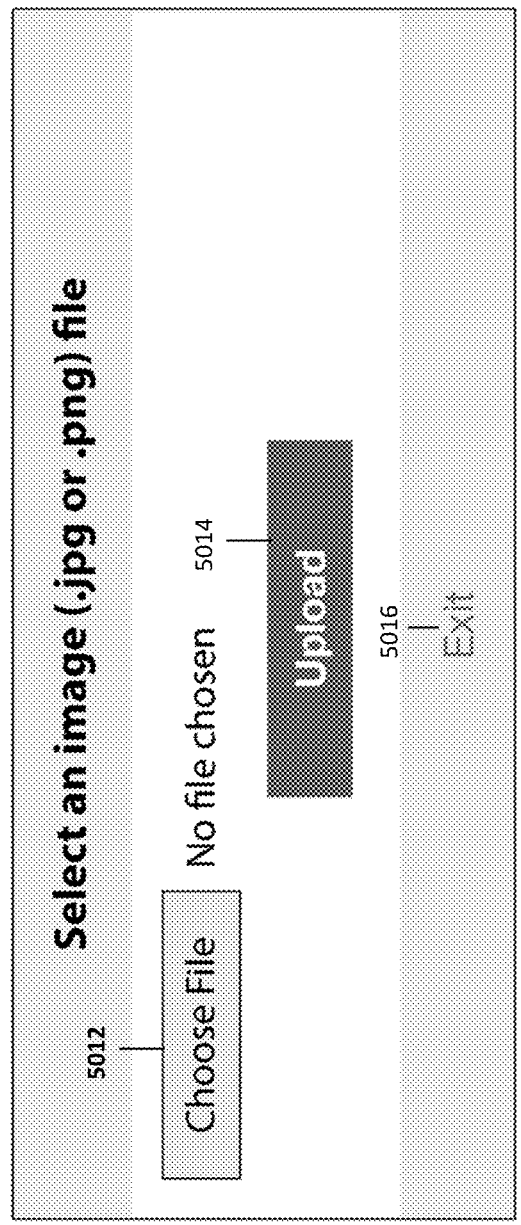
FIG. 5 is a screen used to find and upload files to be used as activities.

Similarly, if image activity 3025 of FIG. 3 is selected, the Host's screen includes a pop-up as shown in FIG. 5. FIG. 5 is a screen to upload files to be used as activities. Activating button 5012 allows the Host to navigate through folders and files to find a desired image file. Once found, the file name is listed on the pop-up and the Host can add this to the activity storage 623 by clicking the "Upload" button 5014 or exiting by clicking the "Exit" button 5016. The inventors anticipate developing methods of uploading in bulk, many files at a time, using drag and drop methods.

Activities can be added by selecting the "+Add Activity" button on FIG. 3 which jumps the Host to a page allowing the Host to navigate to a file or web resource to add as activity.

There is also an Activity Schedule which brings a pop-up or other display which is shown in FIG. 6 having an activities schedule 6001 with a sequence field 6010 indicating the order in which the activities are executed. FIG. 6 shows the Activity Schedule which indicates the sequence in which activities will execute during the Operation Phase. This may be simply sequential in which activity 3 follows activity 2 which follows activity 1. They also may be sequenced by elapsed time from the beginning of the session. Or they may be sequenced by absolute clock time. For example, activity 1 starts at 9:05 am, activity 2 starts at 9:15 am, etc.

Activities 1-5 are internet webpages identified by hyperlinks and descriptions. Activity 6 is an online spreadsheet entitled "Mortgage Calculator" which is stored in activity storage device 621. Activity 7 is an online survey, entitled "Rank your primary interest." All activities run using standard Internet technologies, requiring only standards conformant web browsers.

In another embodiment, a different personalized activity instance is deployed from server 600 to each different user device. Keyboard input from I/O devices 210 of the user devices is sent to server 600, processed by an activity instance on server 600, then the screen output is sent to the user device showing the result.

Figure 7:
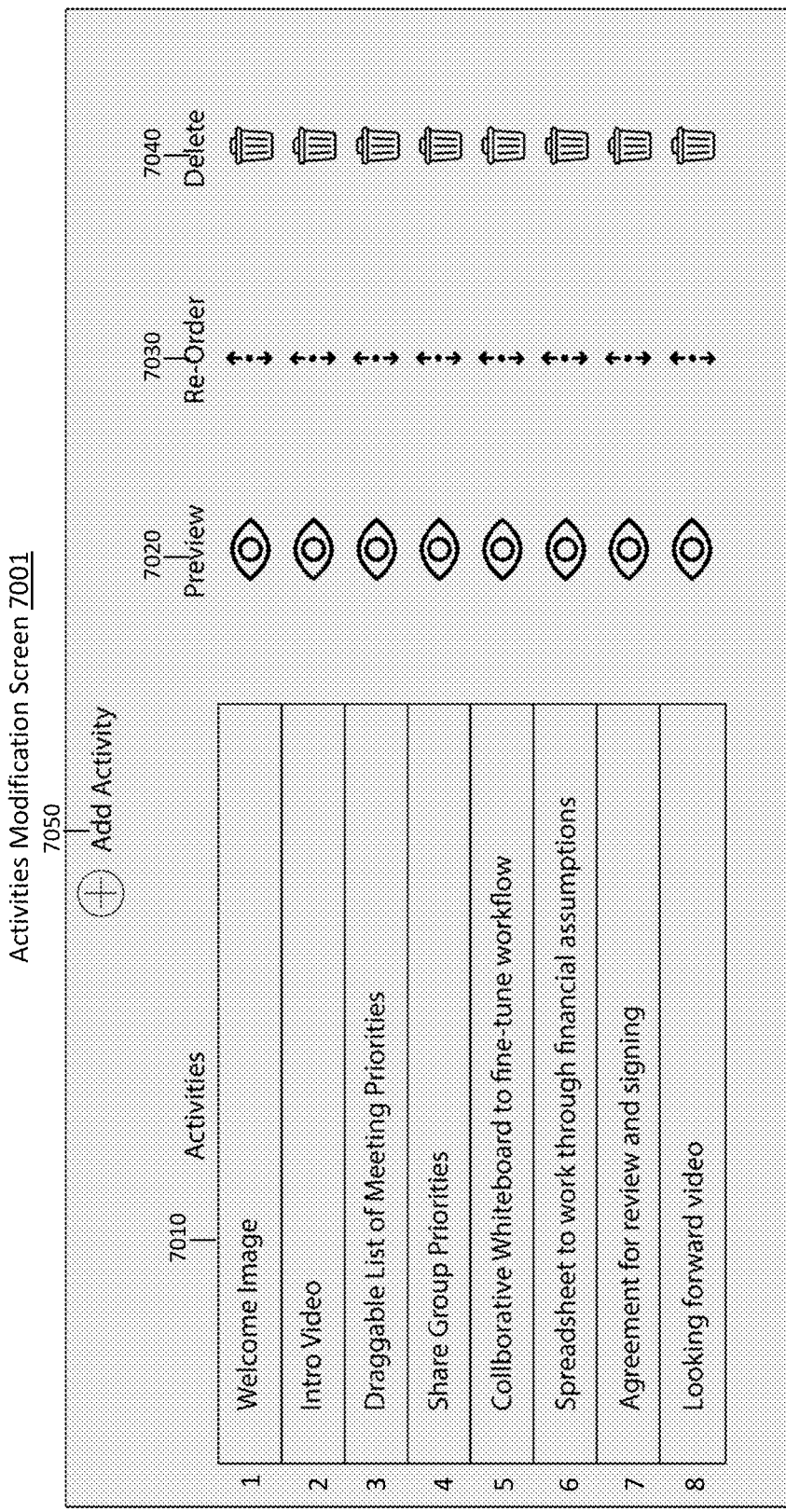
FIG. 7 is an activity manipulation panel allowing the Host to add, delete and modify activities and to change the order in which those activities are performed.

FIG. 7 is an Activity Management Screen allowing the Host to add, delete and modify activities and to change the order in which that activities are performed.

FIG. 7 shows an Activities Modification Screen 7001 having a listing of activities 1-8. For each activity, there is a description 7010. These activities are currently set up to executed in the listed order from top to bottom. However, the Host, through user device 100 can view each activity by clicking the "Preview" icon 7020 to the right of any of the activities. The Host may then change the sequence of execution by moving an activity up for down by clicking and dragging on the "Re-Order" icon 7030 to the right of the desired activity.

Activities can be deleted by clicking on one of the "Delete" icons 7040 to the far right of any activity.

Additional activities may be added by clicking on the "+Add Activity" button 7050 at the top of the screen.

After the Setup Phase, the system 1000 may enter the "Operation Phase".

Referring back to FIG. 2, a simulated view of a display screen of a Host is shown with a WebCam Panel 8010 and an Activity Panel 8020. As the users 2-5 log in to the system 1000, live video appears in the WebCam Panel 2010. As the Host starts an activity, the output of the activity is shown in the Activity Panel 2020 of FIG. 2. In this example, the activity is a video and audio of a person spray painting a car.

In prior art systems, the video would play on the screen of the Host, where it would simply be sampled, and the sample snapshots be sent to the user devices 200-500 for display. Sampling at a high rate provides better video quality but can bog the system down requiring breaks to load data. Sampling at a lower rate results in choppy and poor-quality video and audio.

The current system operates by sending video directly to each user device 200-500. Each user device independently connects directly with the cloud storage 700 and directly streams the video and audio. However, the Host, through user device 100 and controller 610, can modify the browser settings 233 of the user devices 200-500. Therefore, Host can cause the browser 231 to load a webpage, image, web application, or stream a video from the cloud storage 700. The Host can modify the browser settings 233 to cause the output shown on user devices 200-500 to start, stop, rewind, fast forward or otherwise control the video, audio, and operation of activities.

One such embodiment loads a modification program 210 on user devices 200-500 Processor 229 runs the modification program 220 to allow a remote source to modify the browser settings.

Similarly, controller 610 may adjust the layout state 235 of the user devices to change the portion of the screen that is visible, zoom in, highlight objects, or otherwise manipulate the images being displayed on the user devices.

It is also possible for the Host to change the actual content state 237 of the user devices 200-500. This could change the content displayed and the functioning of the user devices.

Controller 610 of server 600 acts as a 'traffic cop' receiving input from user devices and passing output to user devices. Therefore, if users 2 and 3 are designated to be in the same logical 'room' and users 4 and 5 are designated to be in a different logical room, then controller 610 should pass video and audio from user devices 200 and 300 back to user devices 200 and 300. User devices 400 and 500 will have no audio or video connections to user devices 200 and 300 if they are in a different logical room. (User device 100 is for the Host 1 and can create connections with any or all user devices.)

Similarly, video and audio from user device 400 is only shared with user device 500.

Regarding a group activity, user devices 200 and 300 should be running the same activity at the same time and experience the same output if they are in the same logical room. Similarly, user devices 400 and 500 will also run the same activities in their logical room and see the same output at the same time.

If the activity is a group activity (for the room) then input from any user device in the room is used as input to the activity affecting the group experience. For example, when any user changes the interest rate or principal amount in a mortgage calculator, those changes are seen by the whole group. Alternatively, users may be given activities that they experience individually. A quiz or survey is an example of an individual activity. The individual activity provides output that is viewed/heard only by the user running the individual activity.

FIG. 2 shows a Host Main View 2001 with a control panel 2030 having a view icon 2031 which allows user device 100 to change the viewing parameters. This causes controller 610 to modify the layout state 235 of users in the same room.

Play icon 2033 allows the Host to start and stop the activity, such as starting and stopping a pre-recorded video that is streaming to the user devices.

Selecting the Back Control icon 2035 allows the Host to display the prior activity in the Activities Sequence. Selecting the Forward Control 2037 causes the next activity in the sequence to display.

Figure 8:
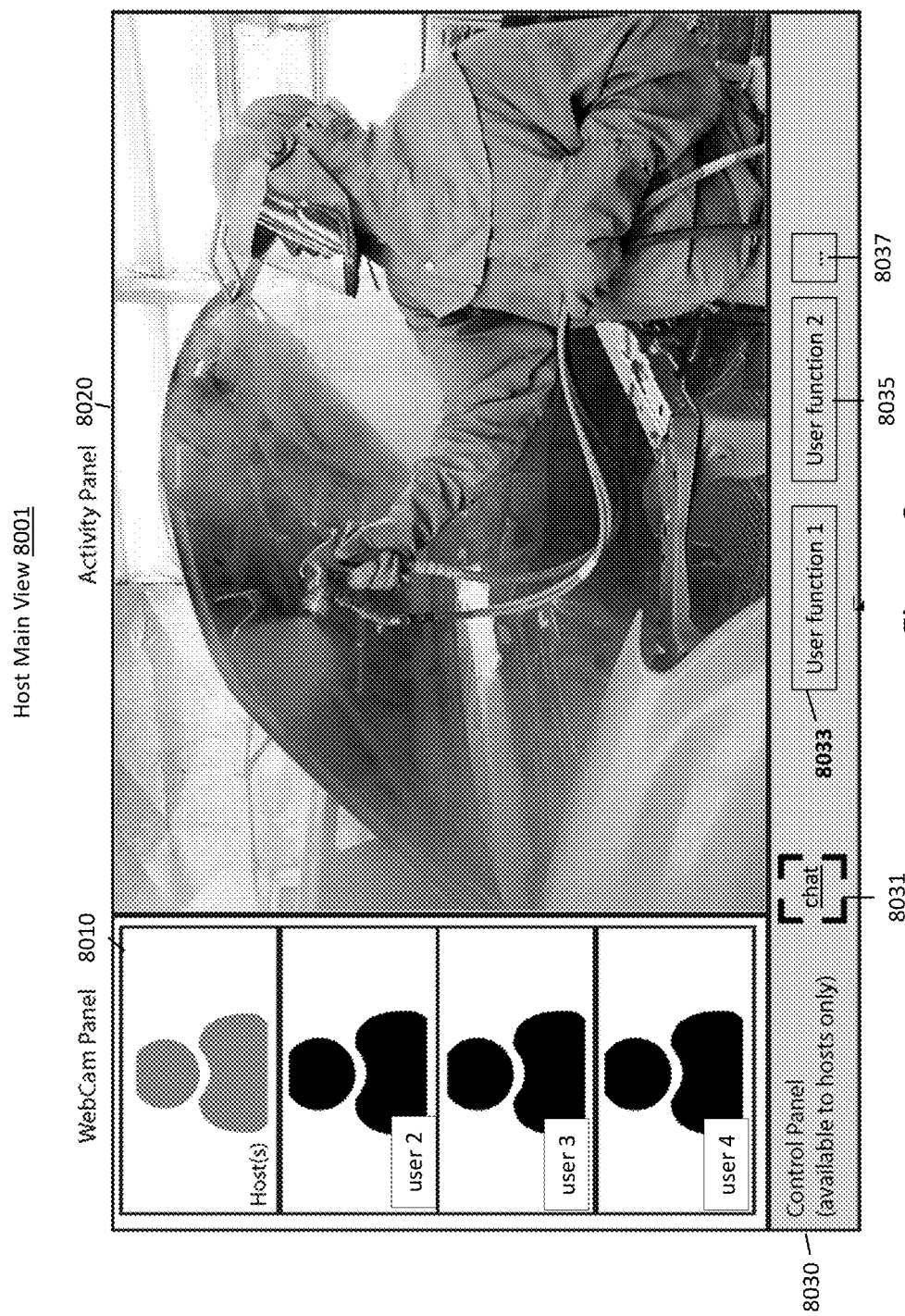
FIG. 8 is a webcam gallery layout displayed on users' screens which shows the Host who is presenting and the users.

FIG. 8 is a User Main View 8001 which is a webcam gallery view displayed on users' screens that shows the Host 1 and the users 2-4. This may show the live video feeds of the entire group, a specific room, multiple feeds separated by group, multiple feeds arranged by other field, such as alphabetically by last name, first name, by performance, or any other measurable factor.

Figure 9:
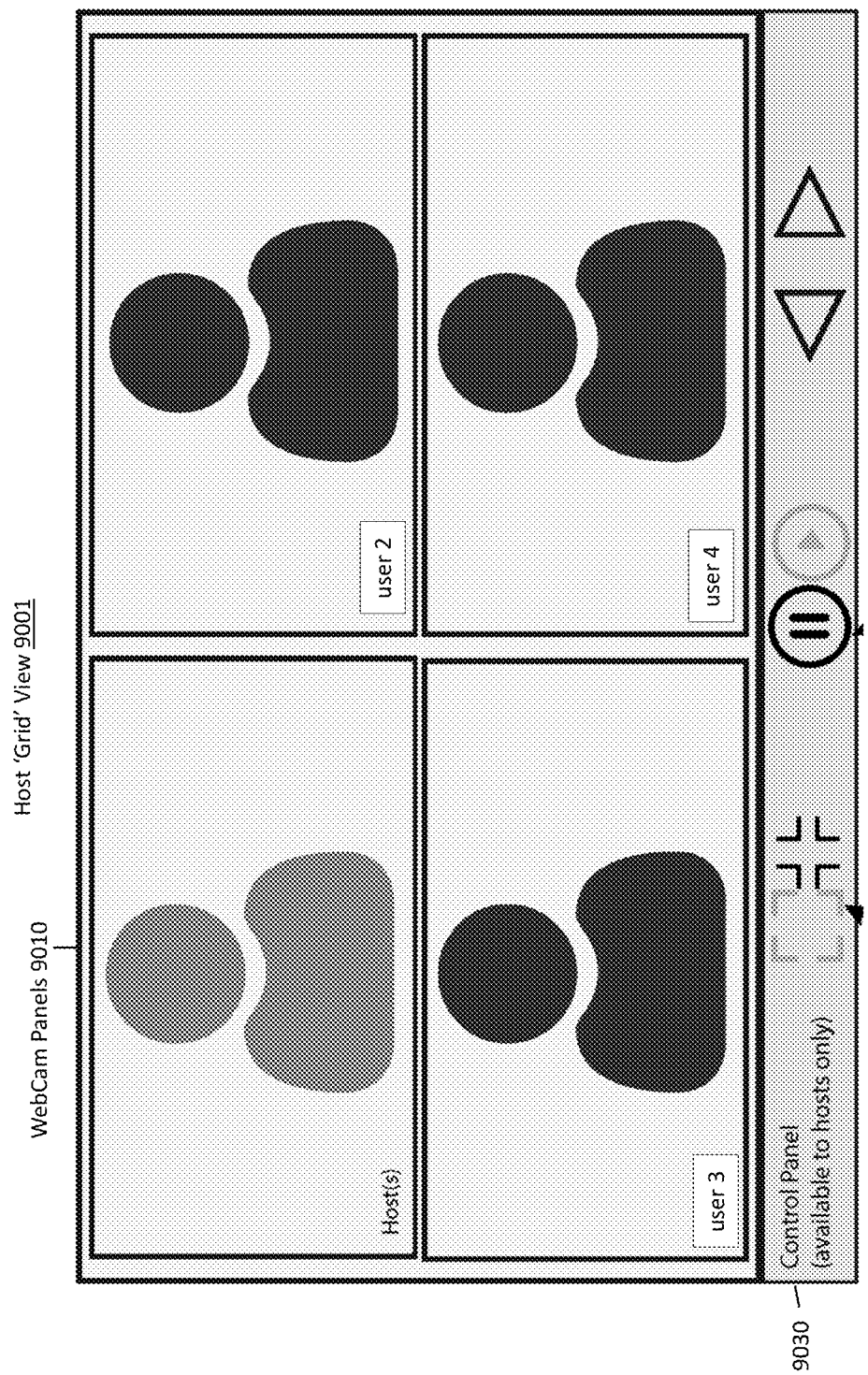
FIG. 9 is a Grid View of a screen of an I/O device 210 of a user device showing all the live streams of several users in a single view.

FIG. 9 is a Hoist 'Grid' View 9001 of a screen of an I/O device 210 of the Host device 100 showing all the live streams of the Host 1 and users 2-4 in a single view.

The feeds may have information about each superimposed, such as the names, room numbers, performance scores, current session participation score, participation scores overall, etc. Participation scores can be as simple as time that the user participated in the session, or times the user spoke in a session. Performance can be a score of correct answers on activities, and overall score for a given period of time, such as a month, quarter, or semester.

Interactivity

The invention combines the best of real-time video, where Hosts and users converse, and interactive materials that challenge students and immerse them in topic content.

These materials may include but are not limited to videos, notes, quizzes, games, whiteboards, fill-in the blanks forms, and any other content that can be delivered online now or in the future, such as artificial and virtual reality.

During remote meetings and online classes, Hosts (or teachers) trigger these materials and activities to appear in synchronicity with their messaging. They are discrete, separate experiences that one-to-many students participate in concurrently.

The invention provides the means to trigger the delivery of discrete, fully functioning interactive web pages that appear on many remote devices in real-time. This allows Hosts and teachers to engage the users with timely, interactive activities and learning.

This invention is an improvement on what currently exists. The invention provides the means to trigger the delivery of discrete, fully functioning interactive web pages that appear on many remote devices in real-time.

Other systems do not provide Hosts with the ability to deliver and measure unlimited interactivity within one integrated video conference experience.

Feedback—Reporting User Participation

As indicated above, current remote session systems do not provide proper feedback to evaluate message reception by the remote users. The current invention addresses this problem.

Using a remote classroom embodiment of the current invention as an example, a teacher (Host 1 or user 1) can see class responses immediately on user device 100 in aggregate or by individual students, to evaluate class progress.

When interactive activities, such as a quiz, are run by user devices 200-500, user input through the I/O devices 210 are passed back to controller 610. Controller 610 has the answers to the quiz questions and can identify which of the users selected the correct answers. These answers are stored in activity storage 623 in a table format such as that shown as Reporting Panel 9001 of FIG. 11. The student ID, Name, Correct Answers to each question, check in time, check out time and class time are recorded and displayed to Host device 100 and Host 1.

A feedback device 613 is coupled to the controller 610 and can monitor the input from the user devices 200-500. It can then calculate reports that are displayed to the Host 1 (Teacher) through the Host device 100 during the session. This provides immediate feedback relating to the performance of each student. Every student action can be measured and reported in real-time, so that teachers understand class and student progress.

This allows teachers to react immediately, clarifying, and amplifying learning points to make sure the lesson is getting delivered.

The Host Main View 2001 of FIG. 2 and the User Main View 8001 of FIG. 8 are essentially the same, with some functions of control panel 2030 not available to user devices 200-500.

Both the Webcam Panel 2010, 8010 and Activity Panel 2020, 8020 are visible in Main Views 2001 and 8001 of FIGS. 2 and 8, respectively. Similarly, a Grid View of FIG. 9 shows all the users in one view. Many different layouts views may be controlled by the Host through user device 100.

Operation of the Invention

With reference to FIGS. 2 and 8, WebCam Panels 2010 and 8010 use chat technologies based on WebRTC and other protocols that enable low latency video conversations. The Activity Panels 2020 and 8020 consist of a collection of web pages or output screens of Apps that appear individually. The Host, through user device 100 and controller 610 uniquely controls the time and sequence in which individual items in the collection appear in remote user devices 200-500.

It's important to note that some "web pages" are more accurately described as "web applications," containing their own navigation system and interactivity.

Every page displayed on the Activity Panel 2020 is stored in a database in activity storage 623, represented by a uniform resource locator (URL) and an associated style sheet that describes how each unit of content will be displayed on user devices 200-500. The database holds this information in a sequence, so that Hosts may advance the users through the content sequence, page by page, using Forward Control (2037 of FIG. 2) and Back Control (2035 of FIG. 2). Alternately, units of content may be chosen in random order, immediately updating the Host device 100 and user devices 200-500.

Users are identified using industry standard methods and protocols for identity resolution. User activity is collected in a database, available for review in report form.

Figure 10:
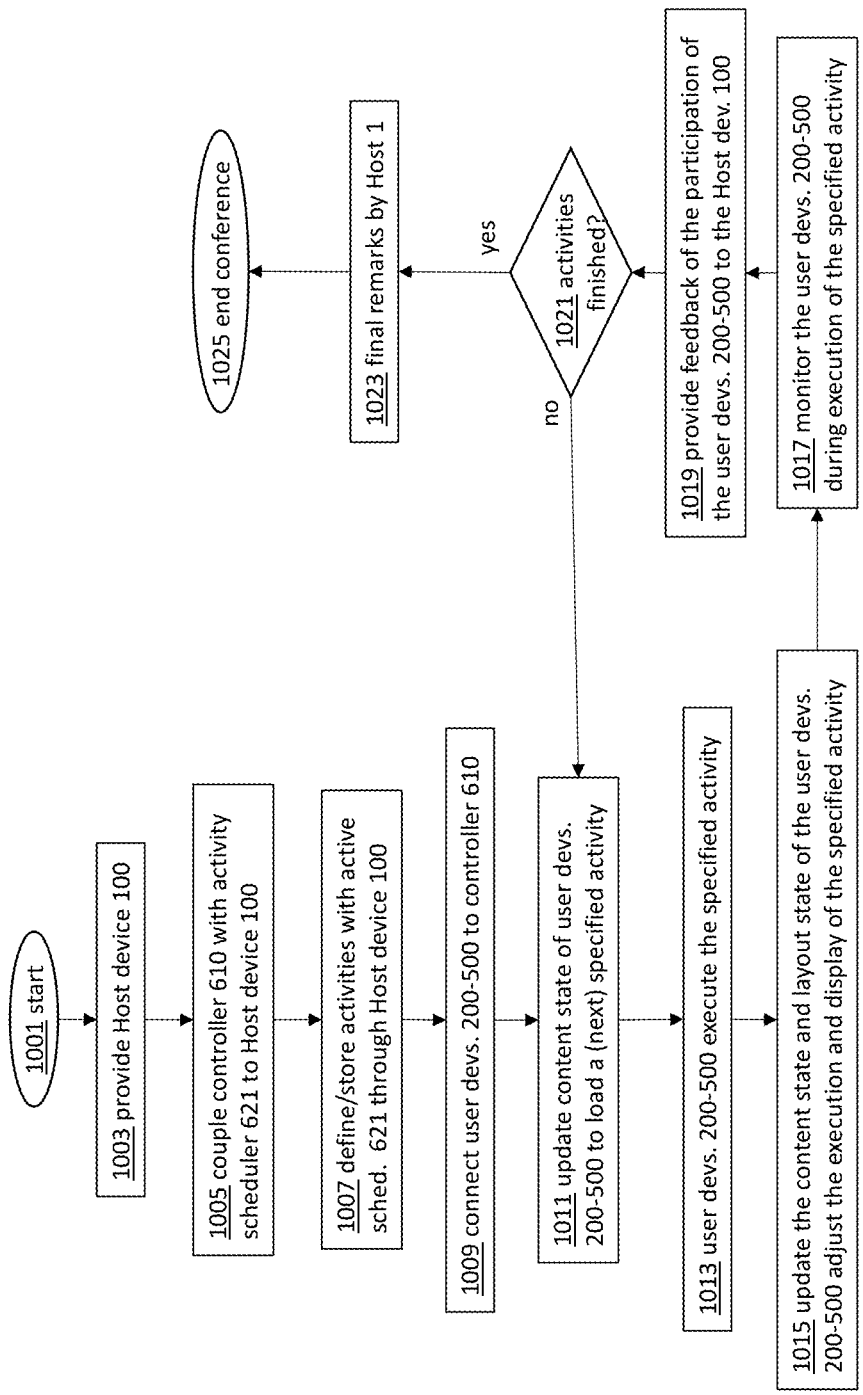
FIG. 10 is flowchart illustrating the functioning of another embodiment of the current invention.

FIG. 10 is flowchart illustrating the functioning of another embodiment of the current invention.

The process starts in FIG. 10 at step 1001. in step 1003 a host device 100 is provided which meets the requirements as defined in the specification.

In step 1005, a controller with an activity scheduler 621 is coupled to the host device 100.

In step 1007 host one interacts with active scheduling device 621 through host device 100. Post one select and previews activities to be run during the video conference. These selected activities are then stored in in activity schedule for use as a guide during the video conference.

In step 1009 if not already connected, user devices 200 dash 500 or connected wirelessly to controller 610.

In step 1011, Host 1 provides input to Host device 100, causing it to interact with controller 610 to update the state of user devices 200-500. This causes user devices 200-500 to run a specified activity and to adjust the viewing parameters shown on each of the user devices 200-500.

In step 1013, user devices 200-500 execute the specified activity.

In step 1015, the content state and layout state are interactively updated by controller 610 to control the execution of the activity on user devices 200-500.

In step 1017, user devices 200-500 are monitored by a monitoring device 613 as they execute the specified activity.

In step 1021, after the current activity is finished execution, it is determined all the activities in the activity schedule have been completed. If all the activities in the activity schedule have been completed ("yes"), then control is passed back to Host 100 for the Host 1 to make any final remarks in step 1023.

After the Host has finished any final remarks, the conference ends at step 1025.

In step 1021, if all of the activities in the activity schedule have not yet been completed ("no"), then processing continues at step 1011.

Referring now to FIG. 11, in a remote classroom example, a short quiz is run as the activity to students in a logical room. Their responses are monitored and are immediately stored. In FIG. 11, there were 4 questions marked "Q1"-"Q4". A "Y" means that the student answered the question correctly. An "N" indicates that the student answered incorrectly. An "I" is an incomplete or no answer received for this question. A "-" indicates that the question does not apply or was presented before the student was in this logical room.

This also keep track of the check-in time, check-out time and actual class time.

The results are monitored and processed by a feedback device 613 attached to controller 610. Since controller 610 directly receives activity of the user devices 200-500, actions can be monitored and immediately forwarded to Host device 100 to give Host 1 immediate, accurate feedback on each of the students.

Feedback device may also process input to give collective reports on, for example, the overall participation of a logical room, entire grade, or other grouping.

The controller 610 is also the 'traffic cop' which directs live streams from user devices 200-500. In an alternative embodiment, feedback device 613 can also monitor the amount of live stream activity, or inactivity. This can give an indication of the motions of users or if they turn off their cameras 241 and microphone 243. This information can also be provided to the Host device 100 as feedback.

The direct video sharing and control of the current system provides entirely new methods for creating and presenting information.

For example, imagine an online news show where reporters can upload and share video clips shot on their phones. Clips are uploaded, dragged into sequence, and paused during the show as the reporter narrates the story. Interleave interactive surveys and you have a whole new world of participatory journalism.

The current system repurposes live meetings. That's possible by recording the webcam video and associating activity triggers with specific points (elapsed time tags) within the webcam video.

For example, if a user, such as Host 1, triggers activity no. 12 at a 5:12 elapsed time mark within the live implementation, that time to activity relationship is captured and activated for the perfectly matching on-demand version of the event. That allows one time creation which may be reused many times in the future providing long time value for classrooms, news reporting, and other forums.

It's easy to record a full screen video without any possibility of interaction. The value current system adds is that it retains interactivity and participation as described above.

The system may include contests, rewards, promotions, and achievement recognition, delivered automatically when milestones are hit, or manually triggered by Hosts.

The invention may be used in situations where remote presenters want to deliver synchronous materials to one of more remote users in real-time.

For example, a salesperson may want to reveal a contract form in the interactive panel for immediate signing to close a sale. Or during a fashion show, while models appear on a runway in the Webcam Panel 2010 with descriptions and shopping carts appearing in the Activity Panel 2020, in synchronization with items appearing on the runway.

We expect the invention to be used in many other fields where Host control of interactive content presented to remote users is useful. Synchronous group viewing of video, with hosts controlling pauses and plays, promises to be a prominent use for consumers jointly enjoying shared entertainment and family content.

While the present disclosure illustrates various aspects of the present teachings, and while these aspects have been described in some detail, it is not the intention of the applicant to restrict or in any way limit the scope of the claimed systems and methods to such detail. Additional advantages and modifications will readily appear to those skilled in the art. Therefore, the teachings of the present application, in its broader aspects, are not limited to the specific details and illustrative examples shown and described. Accordingly, departures may be made from such details without departing from the spirit or scope of the teachings of the present application. Moreover, the foregoing aspects are illustrative, and no single feature or element is essential to all possible combinations that may be claimed in this or a later application.

What is claimed is:

1. A virtual conferencing system for providing a remote session between a plurality of remote users comprising:
   a) a Host device adapted to receive input from and provide output to a meeting Host;
   b) a plurality of user devices each being operated by one of the remote users;
      wherein the user devices comprise:
      1. A camera to provide live video feed;
      2. a microphone to provide live audio feed;
      3. user device memory having a modification program stored in a memory of each user device;
      4. wherein the modification program is adapted to run executable code from the Host, to allow the Host to directly read and update a layout state and a content state stored in a memory of each user device;
   c) a server having a controller coupled to the Host device and the user devices,
      wherein the controller receives memory changes from the Host device and directly implements the changes into the memory of all user devices simultaneously through the modification programs to make changes on-demand and in sync with all other user devices;
      the controller also comprising an activity scheduler that can operate in at least a 'Setup Phase' and an 'Operation Phase';
   d)
   e) wherein, during the 'Setup Phase', the Host device interacts with the activity scheduler according to the input from the Host to:
      1. Create an activity schedule having activities to be executed,
      2. arrange the activities in a desired order of execution, and
      3. store the activity schedule in an activity storage;
      4. Wherein, during the 'Operation Phase', the activity scheduler causes the activities in the activity storage to execute on the user devices in the order defined by modifying the layout state or the content state of memory;
      5. wherein during the 'Operation Phase', the modification program is activated and allows the Host device to change the memory on-demand and update layout state and content state stored in the memory of each user device in sync with the other user devices, interactively operate the user device to control at least one of display type, width, height, video scanning parameters, current scan line, scan rate, resolution, refresh rate, windows open and display parameters for open windows, pointers, tables, and related data of user devices, and select portions of content to display;

6. Wherein the controller receives live video and audio feeds from the cameras and microphones of the participant user devices and directs the live feeds back to selected user devices; and f) a feedback device coupled to the controller that monitors video and audio being received from various user devices to automatically indicate the amount of motion of each remote user, and to forward the indication as a measure of activity to the Host device, providing immediate feedback.

2. The virtual conferencing system of claim 1, wherein at least part of the executable code is a web application, and the layout state and content state relate to the state of the web application and user device, and the controller has the ability to modify the layout state to adjust the viewing parameters of the user device, and the controller also has the ability to modify the content state to adjust what is being displayed on the user devices.

3. The virtual conferencing system of claim 1, wherein the executable code in user device memory is a web browser, the activity scheduler provides a next activity to execute in the content state of the participant user devices, such as a web location for a specific video file to cause the browser to stream the video file to participant user devices.

4. The virtual conferencing system of claim 1 wherein the executable code may be at least one of the group consisting of web-based video and audio, Software as a Service (Saas), and Apps.

5. The virtual conferencing system of claim 1, wherein the executable code stored in Host Memory includes at least one of web-based video and audio, Software as a Service (Saas), and Apps.

6. The virtual conferencing system of claim 1, wherein the controller directs live streams from the Host device and the user devices to other user devices in the same logical room.

7. The virtual conferencing system of claim 1 wherein the user devices each have a direct connection a cloud storage device to receive streaming content, and a second connection to the controller to receive control signals directing the user device to display portions of the streaming content in sync with each other, and directing the user device on how to display the streaming content.

8. The virtual conferencing system of claim 1 wherein the activity is a quiz and feedback device monitors the answers from the user devices to determine and report user participation to the Host device.

9. A virtual conferencing system receiving input from a Host to run a remote video session for a plurality of users, comprising:
   a) a Host device responsive to input from the Host for running the remote video conference;
   b) user devices that receive user input and provide output to users: wherein the user devices each comprise:
      1. An I/O device which receives input from, and provide output to a user operating the user device;
      2. a memory which stores and provides executable code including a modification program;
      3. wherein the modification program is adapted to run executable code from the Host, to allow the Host to directly, read and update a layout state and a content state stored in a memory of each user device;
      4. a processor coupled to the I/O device and memory adapted to load and run executable code from memory, receive input from I/O device and provide output to I/O device;
   c) a server coupled to the Host device comprising:
      1. a controller coupled to the Host device and user devices wherein the controller receives changes to the memory from the Host device and directly implements the changes in the memory of all user devices simultaneously through the modification program to make the changes on-demand and the sync with all user devices;
      2. a controller memory adapted to store executable code, configurations, settings, and other information required to run the executable code to perform activities and calculations;
         wherein the executable code within the controller memory further comprises an activity scheduler which stores to and retrieves from activity storage, data and settings related to the functioning of the activity scheduler;
   d) a cloud storage device having prestored data, which may include streaming data, applied through the Internet coupled directly to the Host device and the user devices to provide streaming data to the user devices;
   e) the controller comprising an activity scheduler which reads activities of an activity schedule prestored in activity storage, and updates the content state of the user devices to execute the activity;
   f) wherein the Host device, through the controller and modification program can directly modify the layout state stored in the memory of each user device to adjust the viewing parameters and modify the content state stored in the memory of each user device to interactively control which portions streaming data viewed.

10. The virtual conferencing system of claim 9 wherein the activity scheduler provides a location of an executable interactive application to the content state of the user devices, causing them to find and execute the interactive application.

11. The virtual conferencing system of claim 10, wherein the controller further comprises:
   a feedback device which coupled to the controller which monitors participant user devices responses to the interactive application and live stream activity and immediately provides an indication of the responses to the Host device.

12. The virtual conferencing system of claim 9, wherein the executable code comprises a web browser, and the settings include web browser settings stored in memory.

13. The virtual conferencing system of claim 9, wherein updates to the content state of the user devices are performed by updating the I/O device and the processor executing a modification program.

14. The virtual conferencing system of claim 9, wherein the controller can modify the layout state to adjust the viewing parameters of an activity being executed through I/O device and processor by executing a modification program.

15. A method of providing a virtual conference to remote users under the control of a Host, comprising the steps of:
   a) providing a Host device which receives input from and provides output to the Host;
   b) providing a controller which includes an activity scheduler that is coupled to the Host device;

c) receiving Host input to select, preview, select order of execution and store a plurality of activities in an activity schedule;
d) connecting user devices to controller;
e) loading an activity specified in the activity schedule;
f) executing the specified activity;
g) employing the Host device to activate a modification program stored in user device memory of each of the user devices to allow a direct modification to one of i) the layout state stored in the memory of the user devices to adjust the display and ii) direct modification of the content state stored in the memory of the user devices to define content to be displayed on the user devices;
h) wherein the modification program is adapted to run executable code from the Host, to allow the Host through the controller to directly access, read and modify the memory of all user devices simultaneously to chance a layout state and a content state stored in a memory of each user device;
i) employing a server having a controller coupled to the Host device and the user devices,
j) wherein the controller receives memory changes from the Host device and directly implements the changes into the memory of all user devices simulataneously through the modification programs to make changes on-demand and in sync with all other user devices,
k) employing a feedback device to monitor live stream activity of the user devices;
l) providing an indication of the monitored activity of each user device to the Host device;
m) determining if all activities of the activity schedule have been completed;
n) if all of the activities in the activity schedule have not been completed, then continuing processing at step "e" above;
o) passing control of the system to Host device to acquire and publish closing remarks of Host; and
p) ending the virtual conference.

16. The method of claim 15, wherein the participation is determined by answers to an interactive activity.

17. The method of claim 15, wherein the interactive activity is a quiz.

18. The method of claim 15, wherein participation is determined by the amount of activity sensed in the live stream from each user device.

19. The method of claim 15, wherein the state of the user devices is updated by the controller.

* * * * *